United States Patent

Brown

[15] 3,707,599
[45] Dec. 26, 1972

[54] APPARATUS FOR SCANNING CONTINUOUSLY MOVING FILM FOR COLOR TELEVISION

[72] Inventor: Morris E. Brown, Fairport, N.Y.

[73] Assignee: Eastman Kodak Company, Rochester, N.Y.

[22] Filed: Dec. 27, 1971

[21] Appl. No.: 212,720

Related U.S. Application Data

[63] Continuation of Ser. No. 33,401, April 30, 1970.

[52] U.S. Cl................................178/7.2, 178/DIG. 28
[51] Int. Cl................................................H04n 5/38
[58] Field of Search...178/7.2, DIG. 28, 6.7 A, 5.2 D

[56]          References Cited

UNITED STATES PATENTS 2,922,841   1/1960   Graziano.........................178/DIG. 28
3,619,483   11/1971   Boots et al......................178/DIG. 28

Primary Examiner—Richard Murray
Attorney—W. H. J. Kline et al.

[57]          ABSTRACT

A system for scanning a continuously moving information bearing strip includes means for varying the position of a scanning raster synchronously with and in the direction of the film movement. When the film motion is stopped for single frame viewing, the position of the scanning raster is also stopped and a full scan of the frame then in position is effected without reframing. According to one embodiment, the position of the scanning raster is varied under control of a rotating potentiometer and, according to a second embodiment, by a ring counter. In a third embodiment, the positioning of the scanning raster is controlled by a member having a variable transmission of radiation and coupled to the movement of the information bearing strip, and a device sensitive to radiation directed through the member.

10 Claims, 8 Drawing Figures

APPARATUS FOR SCANNING CONTINUOUSLY MOVING FILM FOR COLOR TELEVISION

This application is a continuation of application, Ser. No. 33,401 filed Apr. 30, 1970.

BACKGROUND OF THE INVENTION

1. Field of the Invention

This invention relates to a system for scanning motion picture film and more particularly to a system for scanning continuously moving motion picture film to produce a television signal.

2. Description of the Prior Art

The use of motion picture film as a program source for television has become widespread in recent years. It has been shown, for example, that a flying spot scansion system used in conjunction with a continuously moving motion picture film is capable of producing a television image of very good quality.

Film television systems are well known in which a mirror is rotated so as to make a raster effectively motionless when projected on the film. However, linear movement of the mirror usually does not result in linear motion of the raster and the movement of the mirror is usually very carefully controlled. Also, because the moving mirror is driven mechanically, the linkages for driving it must be very precise since at the end of a mirror stroke it must move very rapidly to return to its position at the beginning of the stroke.

SUMMARY OF THE INVENTION

Accordingly, it is an object of my invention to provide an improved television scanning system for motion picture film.

A more specific object of my invention is to attain in a scansion system for motion picture film compatibility between scanning while the film is in motion and scanning while the film is stopped for projection of a "still," so as to substantially eliminate the need for framing adjustments.

One preferred embodiment of the invention includes an apertured film gate, drive means for continuously moving the film through the film gate, means including a vertical deflection circuit for producing a scanning raster, means for projecting an image of the raster through the aperture to the film, photoelectric means for producing an electrical signal in response to the raster image as modified by the film, and means coupled to the vertical deflection circuit for vertically shifting the position of the raster in synchronism with the movement of the film. The position of the raster may be varied such as by a rotating potentiometer directly driven by the film driving means or by a ring counter supplied with output pulses from a tachometer-generator driven directly by the film drive.

Other objects and advantages of the invention will become apparent from the following detailed description taken in connection with the accompany drawing.

DETAILED DESCRIPTION OF THE INVENTION

Figure 1:
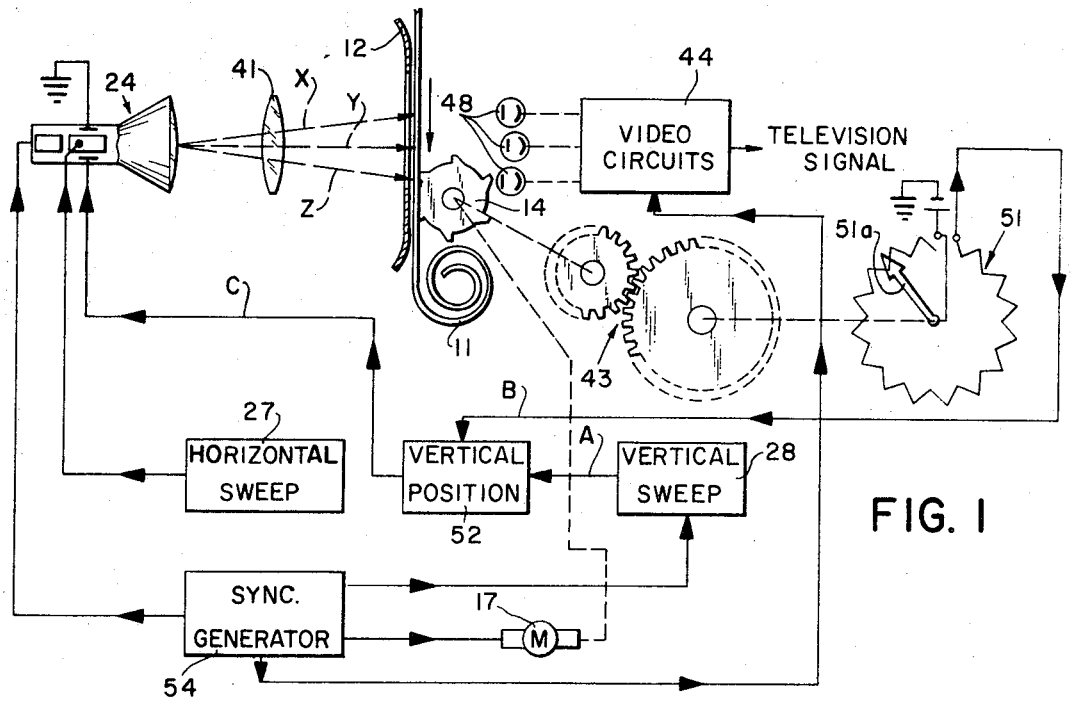
FIG. 1 is a schematic showing in partial perspective of a film scansion system as contemplated by one illustrative embodiment of the invention.

Referring now to the drawing and first to FIG. 1, a motion picture film scansion apparatus in accordance with one specific illustrative embodiment of the invention is shown. A motion picture film 11 which may be color film is shown threaded through a film gate 12 having an aperture 13 therein. The film 11 is adapted to be continuously driven in a downward direction as viewed in FIG. 1 by a sprocket 14 which, in turn, is driven by a film drive motor 17 through a driving coupling indicated by a dashed line.

Figure 2:
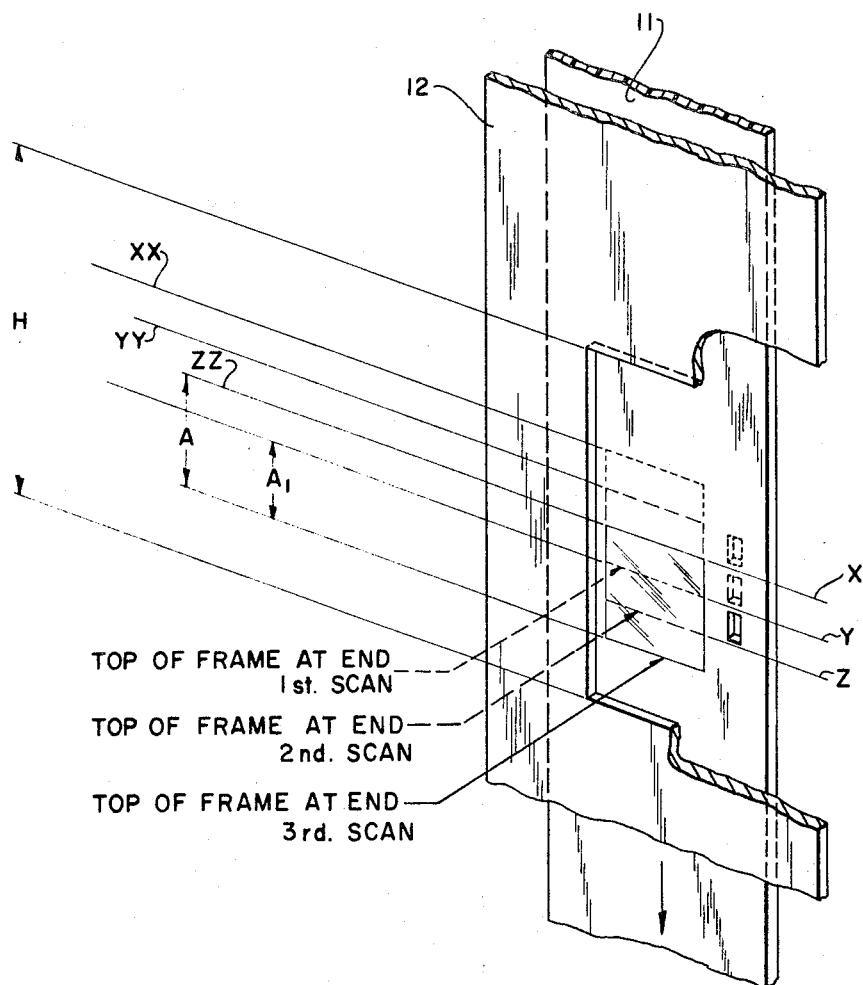
FIG. 2 is a schematic representation of a portion of a film showing particularly the specific areas of one frame which are traversed be successive scans using the apparatus depicted in FIG. 1.

The apparatus of FIG. 1 utilizes a flying spot scansion system. Such systems are well known in the art, and may take various forms such as for example that disclosed in U.S. Pat. No. 2,261,848, issued Nov. 4, 1941, to P.C. Goldmark. Therefore, a detailed description and disclosure is deemed unnecessary. It will suffice for present purposes to state merely that a flying spot raster is produced on the screen of a cathode ray tube 24 by the normal operation of a horizontal deflection circuit 27 and a vertical deflection circuit 28. The light beam emanating from the face of cathode ray tube 24 is focused by lens 41 upon film 11 through film gate 12. It will be understood, of course, that the scanning raster is the pattern formed by the flying spot produced on the screen of the cathode ray tube 24, the image of which is projected onto film 11. As shown in FIG. 2, the image of the scanning pattern is projected on the film 11 with the lower edge of the pattern in registry with the "top" of the frame. (It will be understood that, in view of the normal motion of the film, the image top, which will be referred to as the "top of the frame," is actually located at the bottom of the frame.)

If the apparatus disclosed is used to scan color film, the light rays of the scanning pattern after passing through film 11 may be directed to three photoelectric cells 48; each photocell 48 is sensitive to light of a particular wave length or color, so that the outputs of the three cells collectively contain the complete information for a color picture. The outputs of the cells 48 are coupled to a video circuit 44 which produces a television signal corresponding to the photographic information on film 11 as the flying spot traverses the film 11.

In accordance with one feature of the invention, means are provided whereby the position of the scanning raster is shifted in synchronism with the movement of the film 11. When the movement of sprocket 14 is stopped so as to stop the film 11 for the "still" projection of a particular film frame, the shift in the position of the scanning pattern is also immediately stopped. In the specific illustrative embodiment shown in FIG. 1, a continuously rotatable contact arm 51a of a potentiometer 51 is driven directly by the film drive sprocket 14 through gearing 43. Contact arm 51a is rotated once during scansion of each frame of film. As the contact arm 51a is rotated, it changes the control voltage applied to a vertical position control circuit 52 so as to continuously move the position of the raster in the direction of film motion by varying the bias voltage on the vertical deflection plates of the cathode ray tube 24. Though a DC potential source is illustratively shown in FIG. 1 as being coupled to the contact arm 51a, it is noted that an AC potential source could likewise be incorporated into this circuit.

Referring for the moment to FIG. 2 and assuming that the film 11 is to be advanced at 20 frames per second, which is a close approximation to the standard 18 frame per second frame advancement rate for super-8 film, and that the scanning conforms to U.S. standards, i.e., 60 fields per second, each successive frame of film 11, is to be subjected to three successive scans as the film is driven downward as shown in FIG. 2. The contact arm 51a of potentiometer 51 will therefore rotate one complete revolution for every three scanning cycles. The actual height of a representative frame is indicated by dimension A measured from the start of a scan. However, the first scan of the light beam emitted by the cathode ray tube 24 will start at point X and end at point XX. With the film 11 being driven in downward motion, the scanning height is compressed by an amount dependent upon the relative position of the images on the film or strip 11 with respect to the aperture 13X through the action of potentiometer 51 and vertical position control 52, to the height represented by dimension $A_1$ to cover the full frame height A. The second raster scan starts at point Y and ends at point YY. The third raster scan starts at point Z and ends at point ZZ. The successive positions of the "top of frame" are indicated by the captioned arrows.

Figure 5A:
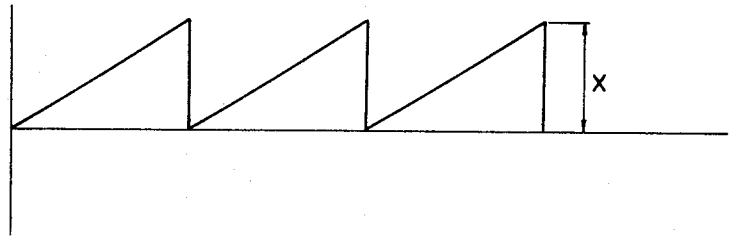
FIGS. 5a, 5b, 5c and 5d are views of wave forms of various potential signals developed at particular points in the circuits of FIGS. 1, 3 and 4.
Figure 5B:
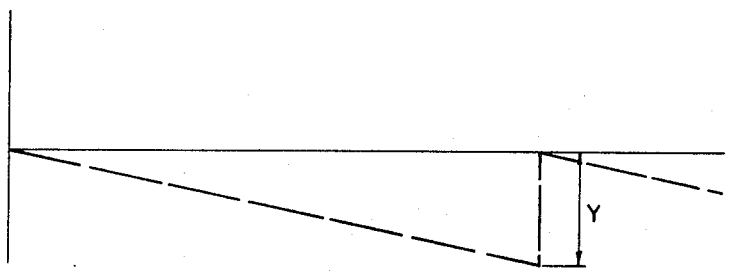
Figure 5C:
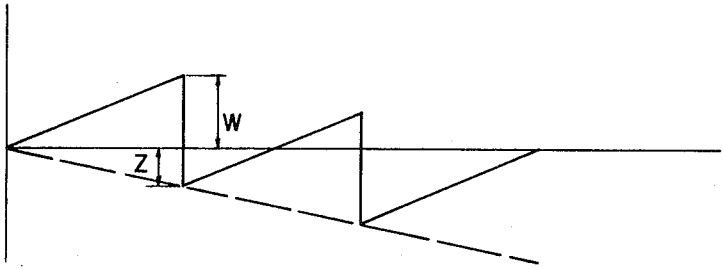

More particularly, the rotation of the contact arm 51a of the potentiometer 51 is synchronized with the motion of the film 11 through the mechanical connection with the sprocket 14 as shown in FIG. 1. As a result, the contact arm 51a will rotate 360°, i.e., one full rotation, while the light beam emitted from the face of the cathode ray tube 24 scans through three complete rasters onto one frame of the film 11. As indicated above, the film 11 is continuously moving through the film gate 12, and it is desired to compensate for the movement of the film 11 by displacing the raster of the scanning beam of light in synchronism with the movement of the film 11. With reference to FIG. 1, the vertical deflection circuit 28 provides a sawtooth wave form as represented in FIG. 5A with an amplitude of X. This signal is applied upon the conductive path indicated by the letter A to the vertical position control 52. In addition, the potential derived from the contact arm 51a has a continuously decreasing waveform of constant slope as shown in FIG. 5B and is applied upon the conductive path indicated by the letter B to the vertical position control 52. The vertical position control 52 operates as a summing or integrating circuit to add the waveforms applied to conductive paths A and B to provide a complex waveform as shown in FIG. 5C. The complex waveform is applied to the vertical deflection electrodes of the cathode ray tube 24. As indicated in FIG. 5C, the amplitude W of the first cycle of the complex waveform is less than the amplitude X by a factor Z. As a result, the vertical deflection of the electron beam of the cathode ray tube 24 is decreased by a corresponding amount to thereby compress the height of the first raster. Therefore, the vertical spacing between each horizontally scanned line of the raster is reduced by the difference between A and $A_1$ (see FIG. 2) divided by the number of horizontal lines in the raster pattern. This compression of the raster pattern corresponds to the decreased amplitude of the vertical deflection signal applied to the cathode ray tube. If as represented in FIGS. 5A and 5B, the amplitude X of the sawtooth waveform generated by the vertical switch circuit 28 is equal to the amplitude of the potential derived from the contact arm 51a, the amplitude of the complex waveform at the end of three cycles will return to a reference or starting point to permit the next cycle of the complex wave form to begin in synchronism with the previous cycle. As a result, the position of the raster on the face of the cathode ray tube 24 will be aligned so as to begin scanning the next frame of the filmstrip 11 as it is moved through the film gate 12. With reference to FIGS. 5C and 2, it may be noted that the successive three cycles of the complex waveform are continually shifted lower to thereby enable the raster of the light beam emitted from the cathode ray tube 24 to follow the same frame as it moves downward as shown in FIG. 2 and to permit three successive scans of this frame.

Figure 5D:
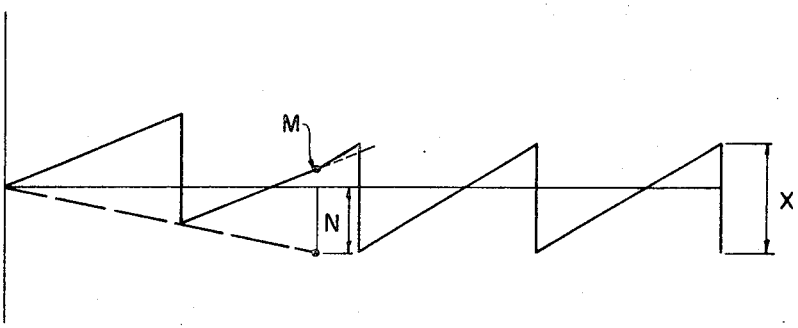

If the film motion is stopped for projection of a single frame or image, the height of the raster scanned by the cathode ray tube 24 is restored affectively to its full amplitude so that the light or radiation beam emanating from the face of the cathode ray tube 24 will scan across the entire height A of a frame. With reference to FIG. 5D the affect of bringing a single frame to a halt within the film gate 12 is shown. For example, if the film 11 is brought to halt at a point in time indicated by M, the rotation of the contact arm 51a is stopped and the potential derived from the potentiometer 51 has an amplitude of approximately N. As a result, from the point in time M onward, the potentiometer voltage remains constant at the point of stopping so that the resultant waveform derived from the position control 52 will be a sawtooth waveform of amplitude X but shifted downward a distance equal to N from the reference line. As a result, the beam of radiation generated from the face of the cathode ray tube 24 will be as shifted a corresponding value to the height N to thereby position the scanning raster of the light beam with the position of the frame to be scanned and also to readjust the height to cover the entire height A of the frame. As the film motion restarts after the still has been scanned, the contact arm 51a of the potentiometer 51 supplies a "bias" voltage of the proper amplitude N determined by the angle or position of the contact arm 51a. Accordingly, as the film 11 and the contact arm 51a begin to move again, the position of the scanning raster and the scanning height of the raster is constantly locked or synchronized with the film motion at the frame position.

With regard to FIG. 2, the height H of the filmgate aperture 13 should be at least twice the frame height A if it is desired to scan a frame of the film 11 in a stationary position without the necessity of repositioning the frame with respect to the aperture 13. However, if no provision is made for still projection, the height of the aperture 13 and the filmgate 12 need be only 1⅓ of the frame height A.

In order to insure that the scan always starts at the top of a frame, the vertical sweep should be synchronized with film motion. This may be accomplished by a sync generator 54 arranged to synchronize the vertical sweep 28, the horizontal sweep 27, and drive motor 17.

Figure 3:
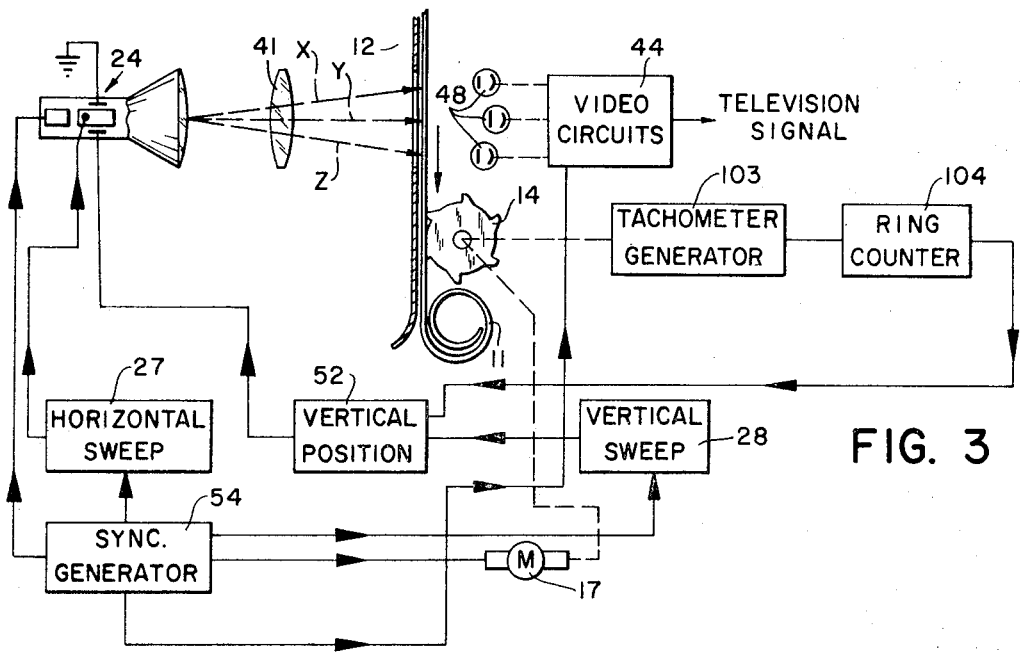
FIG. 3 is a schematic showing in partial perspective of a film scansion system as contemplated by a second illustrative embodiment of the invention.

Referring now to FIG. 3 where parts corresponding to those shown in FIG. 2 have been assigned like reference numerals, another embodiment of the invention is shown which utilizes a different method of shifting the raster position with film movement. As in the embodiment described above, an illuminated flying spot raster is produced on the screen of cathode ray tube 24 by the action of horizontal deflection circuit 27 and vertical deflection circuit 52. The beam of light from the flying spot pattern is projected upon film 11 which, as in the previous embodiment, is driven downward through film gate 12 by sprocket 14 which, in turn, is driven by film drive motor 17.

The image of the scanning raster is projected on a selected frame of film 11 with the lower edge of the pattern in registry with the "top" of the frame. The light rays of the scanning pattern, after passing through film 11, are directed onto photoelectric cells 48; the output from each cell is fed through video circuitry 44 to produce a color video signal, as described with reference to FIG. 1.

In this embodiment a tachometer generator 103 is driven directly by film drive sprocket 14 to generate a plurality of pulses whose number is dependent upon the length of the film 11 driven through the gate 12. The output pulses from the tachometer are counted by a ring counter 104. The ring counter 104 has a number of counting steps corresponding to the number of pulses generated by tachometer generator 103 during projection of a single frame of film 11. At each counting step the ring counter produces an output voltage having a particular amplitude or value representative of that step being activated. Ring counter 104 is set so that the output voltage increases by a uniform amount with each successive step. When ring counter 104 completes its cycle, the output voltage is reset to its initial value. Such tachometers and counters are well known in the art and further description is deemed unnecessary.

Tachometer generator 103 is coupled to sprocket 14 by means such as a gear train (not shown) which enables tachometer generator 103 to produce a plurality of pulses during rotation of the sprocket to advance a single film frame. With each pulse produced by tachometer generator 103, the output voltage of ring counter 104 changes by an incremental amount, thus changing vertical position control 52 so as to move the scan in the direction of film travel.

Although the apparatus shown in FIG. 3 produces only an approximation of the accurate scan motion produced by the apparatus of FIG. 1, it eliminates the need for a mechanical device such as a potentiometer. Accuracy of the apparatus of FIG. 3 may be increased to whatever extent desired by increasing the number of stages in the ring counter, and correspondingly increasing the number of pulses produced by tachometer generator 103 during scansion of a single frame of film 11.

It is to be noted that the film drive should be quickly and positively stopped whenever the ring counter 104 is deactivated to thereby assure that the ring counter 104 and film drive will always start in common relationship after having been deactivated.

Figure 4:
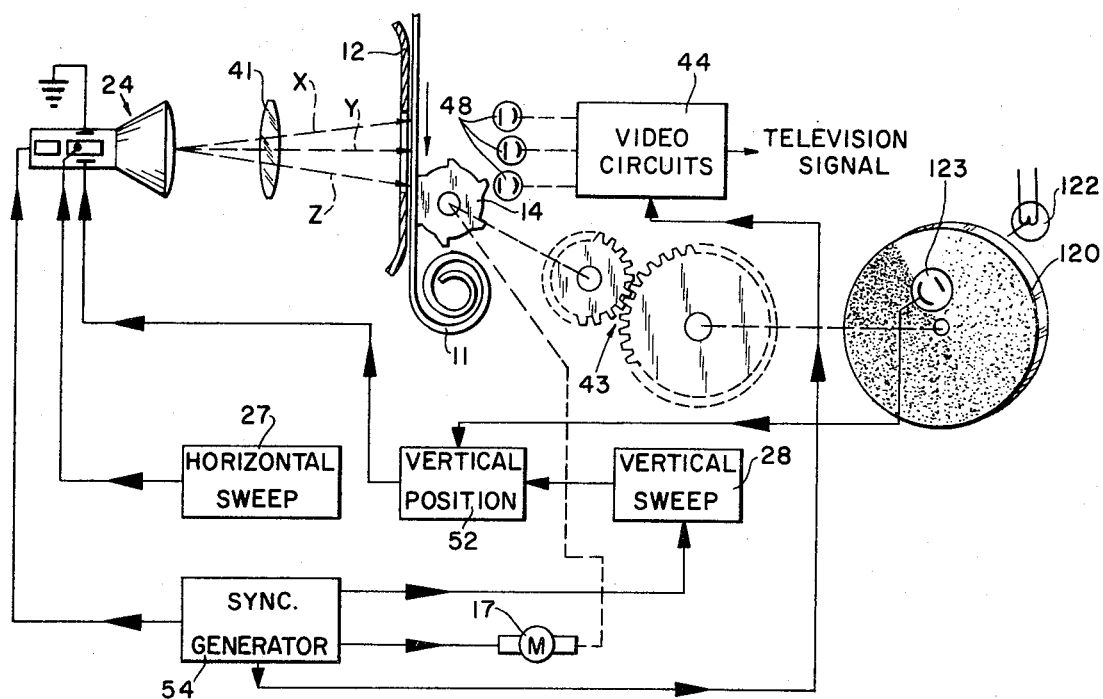
FIG. 4 is a schematic view in partial perspective of a film scansion system in accordance with a third illustrative embodiment of the invention.

Referring now to FIG. 4, where parts corresponding to those shown in FIGS. 1 and 3 have been assigned like reference numerals, another embodiment of the invention is shown which utilizes a different method of shifting the raster position with film movement. As described in the embodiments above, a raster is generated by a cathode ray tube 24 and is focused upon the film 11 directed through a filmgate 12. The sprocket 14 driving the film 11 is mechanically connected to rotate a disc or member 120, which as shown in FIG. 4 has portions whose transmissivity to radiation directed therethrough varies gradually from a high transmissive portion to a portion of low light transmission. Further, there is included a source of radiation such as a lamp 122 which is directed through the disc 120 to be sensed by a radiation sensitive device such as a photocell 123. Thus, as the disc 120 rotates in a clockwise direction, successively less radiation will be directed onto the photocell 123 and as a result the potential therefrom will decrease. Thus, as the voltage derived from the photocell 123 decreases, the vertical position control 52 may operate as described above to move the position of the raster in synchronization with the movement of the film 11.

It will be readily apparent that, by virtue of the novel arrangements disclosed whereby the image position shifting means is directly controlled by the film drive means, shifting of the raster position is readily effected in exact synchronism with the film movement and, further, that the position shifting ceases immediately upon film stoppage. This assures that no reframing is necessary when still projection is desired.

The invention has been described in detail with particular reference to preferred embodiments thereof, but it will be understood that variations and modifications can be effected within the spirit and scope of the invention.

I claim:

1. Apparatus for deriving an image signal from an information bearing medium having a plurality of successive image frames disposed thereon, the image frames having a given dimension along the length of the information bearing medium, said apparatus comprising:
   a. means for defining an aperture;
   b. drive means operable in a first mode for moving the image frames of the information bearing medium at a nominal rate relative to said aperture and operable in a second mode for disposing an image frame of the information bearing medium in a stationary relationship with respect to said aperture;
   c. means for producing a first signal having a first frequency equal to the predetermined repetitive frequency of said scanning means, a first wave form having a maximum amplitude related to the given dimension of said image frames and a first slope established by the first frequency and the maximum amplitude of the first signal;
   d. means responsive to the relative position and the nominal rate of movement of the image frames with respect to said aperture for producing a second signal indicative of the relative position of the scanned image frames with respect to said aperture when said drive means is operative in said first mode, said second signal having a second frequency equal to an integral submultiple of the first frequency and related to the nominal rate of movement of the image frames and a second wave form having a maximum amplitude related to the given dimension of the image frames and a second slope established by the second frequency and the maximum amplitude of the second signal;

e. means responsive to the operation of said moving means in said second mode for producing a third signal having a signal level dependent upon the relative position of a stationary image frame with respect to said aperture;

f. means responsive to the operation of said moving means in said first mode for combining the first signal and the second signal to produce a fourth signal having fourth frequency related to the combined first and second frequencies and a complex wave form having repetitive cycle recurring at the second frequency;

g. means responsive to the operation of said moving means in said second mode for combining the first signal and the third signal to produce a fifth signal;

h. scanning means responsive to the operation of said moving means in said first mode and responsive to the fourth signal for scanning, at the first frequency, said image frames moving relative to said aperture in a raster pattern comprising a plurality of spaced line scans, and responsive to the operation of said moving means in said second mode and the fifth signal for scanning, at the first frequency, the stationary image frames located with respect to said aperture in said raster pattern; and i. means responsive to the scanning of said image frames by said scanning means for providing an image signal of the scanned image frames.

2. The apparatus of claim 1 wherein said second and third signal producing means includes a variable impedance connected to a potential source and a movable contact coupled to said drive means, which, when operative in said first mode moves said contact over said variable impedance to produce the second signal on said contact and which, when operative in said second mode, maintains said contact at a point on said variable impedance corresponding to the stationary position of an image frame with respect to said aperture to produce the third signal on said contact.

3. The apparatus of claim 1 wherein said second and third signal producing means comprises a member rotatively connected to said drive means and having first and second portions of differing radiation transmission, means for generating and directing radiation through said member, and means responsive to the radiation transmitted through said member for providing the second signal having the second frequency and second wave form dependent upon the transmitted radiation when said drive means is operative in said first mode and the third signal having a constant amplitude related to the position of an image frame with respect to said aperture when said drive means is operative in said second mode.

4. The apparatus of claim 1 wherein the first wave form of the first signal comprises a sawtooth wave form of a first polarity, the second wave form of the second signal comprises a sawtooth wave form of a second polarity, and the complex wave form of the third signal comprises a cyclic sawtooth wave form of the first polarity.

5. A method of repetitively deriving an image signal recurring at a first predetermined frequency from an information bearing medium having a plurality of successive image frames disposed thereon, the image frames having a given dimension along the length of the information bearing medium, said method comprising the steps of:

a. moving the image frames of the information bearing medium at a nominal rate relative to an aperture;

b. providing a first signal having a regular, periodic, wave form of said first frequency and a maximum amplitude related to said given dimension;

c. detecting the nominal rate of movement of the image frames relative to said aperture and producing therefrom a second signal having a second frequency, a regular, periodic wave form of a second frequency and a maximum amplitude related to said given dimension, the second frequency being related to the nominal rate of movement of the image frames and the wave form of the second signal being representative of the instantaneous position of an image frame with respect to said aperture;

d. scanning at said first predetermined repetitive frequency of the first signal said image frames moving relative to said aperture in a raster pattern comprising a plurality of spaced line scans and providing an image signal of the scanned image frames in response to the first and second signals;

e. halting the movement of an image frame of the information bearing medium in a stationary relationship to said aperture;

f. detecting the position of the stationary image frame and producing a third signal having an amplitude representative of the detected stationary position of the stationary image frame; and g. scanning at said first predetermined repetitive frequency said stationary image frame in said raster pattern and providing an image signal of the scanned image frame in response to the first and third signals.

6. A method of repetitively deriving an image signal recurring at a first predetermined frequency from an information bearing medium having a plurality of successive image frames disposed thereon, the image frames having a given dimension along the length of the information bearing medium, said method comprising the steps of:

a. moving the image frames of the information bearing medium at a nominal rate relative to an aperture;

b. providing a first signal having a regular, periodic, wave form of said first frequency and a maximum amplitude related to said given dimension;

c. detecting the nominal rate of movement of the image frames relative to said aperture and producing therefrom a second signal having a second frequency, a regular, periodic wave form of a second frequency and a maximum amplitude related to said given dimension, the second frequency being related to the first frequency as an integral submultiple thereof, and the wave form of the second signal being representative of the instantaneous position of an image frame with respect to said aperture;
d. scanning at said first predetermined repetitive frequency said image frames moving relative to said aperture in a raster pattern comprising a plurality of spaced line scans and providing an image signal of the scanned image frames in response to the first and second signals;
e. halting the movement of an image frame of the information bearing medium in a stationary relationship to said aperture;
f. detecting the position of the stationary image frame and producing a third signal having an amplitude representative of the detected stationary position of the stationary image frames; and
g. scanning at said first predetermined repetitive frequency said stationary image frame in said raster pattern and providing an image signal of the scanned image frame in response to the first and third signals.

7. Apparatus for deriving an image frame from an information bearing medium having a plurality of successive image frames disposed thereon, the image frames having a given dimension along the length of the information bearing medium, said apparatus comprising:
a. means for defining an aperture;
b. means operable in a first mode for moving the image frames of the information bearing medium at a nominal rate relative to said aperture and operable in a second mode for disposing the information bearing medium in a stationary relationship with respect to said aperture;
c. means for providing a first signal having a first regular, periodic wave form of a first frequency, said first wave form having a maximum amplitude dependent upon the given dimension of said image frames;
d. means responsive to the operation of said moving means in said first mode for producing a second signal having a second regular, periodic, wave form of a second frequency, said second frequency being lower than the first frequency and being related to the rate of movement of the moving image frames, the second wave form having a maximum amplitude dependent upon the given dimension of said image frames;
e. means responsive to the operation of said moving means in said second mode for producing a third signal having a signal level dependent upon the relative position of a stationary image frame with respect to said aperture;
f. means responsive to the operation of said moving means in said first mode for combining the first signal and the second signal to produce a fourth signal having fourth frequency related to the combined first and second frequencies and a complex wave form having a repetitive cycle recurring at the second frequency;
g. means responsive to the operation of said moving means in said second mode for combining the first signal and the third signal to produce a fifth signal;
h. scanning means responsive to the operation of said moving means in said first mode and responsive to the fourth signal for scanning, at the first frequency, said image frames moving relative to said aperture in a raster pattern comprising a plurality of spaced line scans, and responsive to the operation of said moving means in said second mode and the fifth signal for scanning, at the first frequency, the stationary image frames located with respect to said aperture in said raster pattern; and
i. means responsive to the scanning of said image frames by said scanning means for providing an image signal of the scanned image frames.

8. The apparatus of claim 7 wherein the first wave form of the first signal comprises a sawtooth wave form having a first predetermined slope and polarity, the second wave form of the second signal comprises a sawtooth wave form of a second predetermined slope and polarity, and the complex wave form of the fourth signal comprises a cyclic sawtooth wave form of the first predetermined polarity.

9. The apparatus of claim 7 wherein said second and third signal producing means includes a variable impedance connected to a potential source and a movable contact coupled to said drive means, which, when operative in said first mode moves said contact over said variable impedance to produce the second signal on said contact and which, when operative in said second mode, maintains said contact at a point on said variable impedance corresponding to the stationary position of an image frame with respect to said aperture to produce the third signal on said contact.

10. The apparatus of claim 7 wherein said second and third signal producing means comprises a member rotatively connected to said drive means and having first and second portions of differing radiation transmission, means for generating and directing radiation through said member, and means responsive to the radiation transmitted through said member for providing the second signal having the second frequency and second wave form dependent upon the transmitted radiation when said drive means is operative in said first mode and the third signal having a constant amplitude related to the position of an image frame with respect to said aperture when said drive means is operative in said second mode.

* * * * *